(12) United States Patent
Korman (10) Patent No.: US 11,543,361 B2
(45) Date of Patent: Jan. 3, 2023

(54) METHOD FOR MINIMIZING AND ELIMINATING SHEETROCK SANDING USING AN ILLUMINATING DEVICE

(71) Applicant: James Scott Korman, Stony Brook, NY (US)

(72) Inventor: James Scott Korman, Stony Brook, NY (US)

( * ) Notice: Subject to any disclaimer, the term of this patent is extended or adjusted under 35 U.S.C. 154(b) by 30 days.

(21) Appl. No.: 17/730,319

(22) Filed: Apr. 27, 2022

(65) Prior Publication Data

US 2022/0252522 A1  Aug. 11, 2022

Related U.S. Application Data

(63) Continuation-in-part of application No. 17/542,388, filed on Dec. 4, 2021.

(60) Provisional application No. 63/121,911, filed on Dec. 5, 2020.

(51) Int. Cl.
| | |
|---|---|
| *G01N 21/88* | (2006.01) |
| *F21L 2/00* | (2006.01) |
| *H05B 47/155* | (2020.01) |
| *H05B 47/19* | (2020.01) |
| *F21Y 115/10* | (2016.01) |

(52) U.S. Cl.
CPC ............ *G01N 21/8803* (2013.01); *F21L 2/00* (2013.01); *G01N 21/8806* (2013.01); *H05B 47/155* (2020.01); *H05B 47/19* (2020.01); *F21Y 2115/10* (2016.08); *G01N 2021/8816* (2013.01); *G01N 2021/8835* (2013.01)

(58) Field of Classification Search
CPC ........... G01N 21/8803; G01N 21/8806; G01N 2021/8816; G01N 2021/8835; H05B 47/19; H05B 47/155; F21L 2/00; F21Y 2115/10
USPC ...................... 356/237.1–237.6, 239.1–239.8
See application file for complete search history.

(56) References Cited

U.S. PATENT DOCUMENTS

| | | | | |
|---|---|---|---|---|
| 4,794,963 A | * | 1/1989 | Oppeneer | ............... B27B 25/02 83/61 |
| 2010/0188500 A1 | * | 7/2010 | Bouchard | .......... G01N 21/8901 348/370 |

* cited by examiner

*Primary Examiner* — Tri T Ton
(74) *Attorney, Agent, or Firm* — Boris Leschinsky (57) ABSTRACT

A method to minimize applying joint compound and sanding by illuminating an area of the gypsum board to show anomalies thereon includes a step of providing a plurality of wireless lighting devices operable by a common remote controller, a step of removably attaching these devices in a spaced-apart arrangement and using the remote controller to energize all lighting devices to identify remaining anomalies. All lighting devices are turned off once the next coat of joint compound is applied and then turned on after it dries to illuminate the remaining surface anomalies. Operation of lighting devices is accomplished without removing or repositioning thereof to assure consistency of illumination over the entire work period.

16 Claims, 4 Drawing Sheets

METHOD FOR MINIMIZING AND ELIMINATING SHEETROCK SANDING USING AN ILLUMINATING DEVICE

CROSS-REFERENCE TO RELATED APPLICATIONS

The present application is a continuation-in-part of and claims a priority date benefit from my co-pending U.S. patent application Ser. No. 17/542,388 filed 4 Dec. 2021 with the same title, which in turn claims a priority date benefit from my U.S. Provisional Patent Application No. 63/121,911 filed on 5 Dec. 2020, both of which are incorporated herein by reference in their respective entireties.

TECHNICAL FIELD

The present application describes novel methods of using light for detecting and defining imperfections in a gypsum board throughout the spackling and sanding finishing process in order to obtain a desired smooth finish. The methods of the invention can be used in the home construction and improvement industry and can be practiced by homeowners as well as by professional contractors. The lighting tool has a magnetic head in some embodiments that allows its temporary attachment to heads of screws or other metallic elements or inclusions of the wall.

BACKGROUND

In building construction, different types of claddings are used as panels for forming interior walls as well as ceiling surfaces. For simplicity, as used herein, it will be understood that the term "wall" also encompasses ceilings. Typically, the claddings are in the form of boards (also referred to as panels) affixed to framing members such as room framing arrangements known in the art. Examples of claddings include gypsum board faced with paper, fibrous mats (e.g., fiberglass), and the like. The use of gypsum board panels, also referred to as "sheetrock" or "drywall", became the preferred building practice for making interior walls and partitions in most types of buildings in the United States, primarily because of their relatively low cost, both of material as well as installation. These panels are essentially made of a hardened plaster-like gypsum material sandwiched between sheets of paper or cardboard material. All of these one or more panels are generally referred to as a "gypsum board" for the purposes of this description.

Sheetrock panels are typically nailed or screwed to spaced apart wooden studs or joists to provide a flat wall or ceiling surface which spans these wooden supporting studs, leaving the space between the studs or joists hollow behind the wall surface. These and other types of boards are typically cut to appropriate dimensions and then fastened to the framing members using screws, nails, or the like to form extended and continuous wall sections formed from multiple boards.

The surface of gypsum board wall sections is normally finished to provide aesthetically pleasing, uniform, and protected continuous surfaces. This is typically done by filling irregularities and indentations, such as those in the areas where nails or screws have been driven through the face of the panel. The small gaps between panels are similarly filled and taped over using paper tape which is sufficiently wide to bridge the gap between panels and which is held in place by the filler material. The filler used for this purpose is referred to as a "joint compound" or a "drywall compound," a mud-like material that is smoothed into place and allowed to dry and harden. However, even the dried filler material has relatively little structural integrity and provides primarily the cosmetic benefit of a smooth wall or ceiling surface. The filler material by itself also has a tendency to shrink while drying and is therefore susceptible to cracking, particularly where it is used in large quantities or in thick layers.

For example, two side-by-side boards disposed in the same plane will form a joint seam between them on vertical walls and horizontal ceilings. To finish the seam, joint reinforcement tape is embedded in the seam, along with a layer of a joint compound material dispensed under the tape, as well as multiple coats of joint compound applied over the tape. The installed reinforcement is then concealed with multiple layers of joint compound applied over the corner trim. Fasteners used to affix the board to framing members must also be concealed with multiple layers of joint compound applied over them. After the various joint compound applications are dried, the resulting wall surfaces can be sanded and painted to form the desired uniform and aesthetically pleasing continuous appearance.

The level of finish generally corresponds with the number of applications of joint compound to seams, trims, and fasteners. For example, level five is the highest level (on a scale from zero to five) and is usually achieved by applying a skim coat of joint compound across the entire wall surface.

The primary drawback to using gypsum board material is that a high degree of expertise and experience is required to successfully apply joint compound to these surfaces in preparation for finishing the gypsum board. Homeowners do not typically have that expertise and so it becomes difficult for a typical homeowner to achieve a high level of finish when installing a new section of drywall.

A simple, easy to use and inexpensive method for finishing sheetrock walls has eluded inventors, drywall professionals, handymen-homeowners, and building maintenance personnel, for as long as such materials have been in common use. Finishing gypsum boards can be relatively difficult, especially in the most common situation where drywall sheets are butted together with no height difference as compared to the rest of the wallboard surface.

In addition, the need for applying multiple coats of a joint compound requires that the user allows sufficient time between applications to achieve full drying of the joint compound. As the joint compound dries out, its shape may change, which creates a requirement for applying additional coats of the joint compound to eventually achieve the desired smooth finish.

Presently, gypsum board walls for new construction and remodeling applications are installed with screws and the seams are taped and spackled. The term "spackle" is used as an alternative term to describe application of a joint compound. There are roughly (36) screw heads and 12 feet of seam tape per each 4 ft×8 ft gypsum board to be spackled. Typically, (3) coats of joint compound followed by sanding are required in preparation for painting. Jobsite works lights are part of the process and are sometimes used to see where the filling and sanding are required, especially when determining how much of the joint compound to apply to even the levels of the joints and adjacent boards. With these types of work lights, the detail is mostly rendered in a two-dimensional (2-D) format with the fine details sometimes being overlooked. Additionally, moving the lights from one place to another disturbs the pattern of illumination and frequently conceals the defects that would otherwise be more visible when the locations of the lights are not disturbed.

A further difficulty with the present use of conventional construction site work lights is that the installer is frequently working in their own shadow due to the positioning of the work lights. Often surface imperfections that are not corrected before paint are visible after the job has been completed when illuminated with electric or natural light. These anomalies can be in the form of ridges and depressions as well as the edges of joint compound which have not been completely feathered out to zero.

There is a need for a novel way to pinpoint precisely where to apply joint compound prior to paint. This novel method would also reduce the amount of joint compound required and minimize or even eliminate the sanding process time. Consistent illumination of the gypsum board would also help in reducing the time to complete the project by visualizing the exact location of work without changing the lights between applications of the joint compound.

SUMMARY

The present invention overcomes the aforementioned problems by providing a novel method that precisely illuminates and delineates areas on the gypsum board with aberrations, and anomalies. The steps of the method include applying multiple coats of the joint compound without adjusting or repositioning the plurality of wireless lighting devices so as to assure the same constant illumination of all anomalies throughout the entirety of the gypsum board finishing process.

The method of illuminating the aforementioned issues includes use of a plurality of wireless lighting devices. The lighting device comprises a removable mounting component such as a magnet or a layer of adhesive that allows attachment of the lighting device to the gypsum board, and in particular to a screw, a nail head, a metal corner bead, or any metallic fixture that is integrated into the gypsum board. The light emitter may also be secured within a junction box present in the wall.

The light-emitting diodes of the lighting emitter may be positioned orthogonally at the periphery of the main body. The diodes may be secured to the main body such that the light is directed away from the centerline of the device to cast illumination across the surface of the gypsum board.

Upon attachment to the gypsum board and energizing, the light emitted from the lighting device may be directed to be substantially parallel to the board and dispersed across the surface thereof.

The projected light pattern from the plurality of wireless lighting devices and multiple illumination angles highlights and makes visible any flaws or imperfections in the body surface by magnifying an observer's perception of relative depth differences between the highs and lows of the surface. The objective of the finish is to have the joint compound and the gypsum board to be on the same level. The light-emitting diodes can be selected using a variety of colors and variations as a further alternative to a traditional white light-emitting diode which is conventionally used to highlight imperfections and anomalies in sheetrock.

The wireless lighting device of the invention may be powered by an internal rechargeable battery which permits the use of the lighting device at remote locations where a standard outlet may not be accessible. Further, such an arrangement permits the use of the lighting device in situations where it would be impractical and potentially dangerous to use a lengthy extension cord to provide wall power to the light emitter. For example, the use of the plurality of wireless lighting devices with an internal and rechargeable battery pack is particularly well adapted for use in construction where each lighting device can be attached to a screw, for example, in the gypsum board, so specific areas of the wall under construction can receive joint compound more precisely and without excessive waste.

Each lighting device may further include a wireless on-off switch. All lighting devices may be configured such that all lights are turned on and off with a single common remote controller. This allows turning the lights on and off without touching each lighting device—so that during the joint compound drying time (such as overnight in most cases) the battery in each device is not unnecessarily depleted. Once the joint compound is dry, the remote controller may be operated to turn all wireless lighting devices on so as to illuminate the anomalies the same exact way as before—leading to a better result in obtaining a smooth finish on the gypsum board.

In broad terms, the method of identifying anomalies in a gypsum board and creating a smooth finish thereon comprises the following steps:
 (a) providing a plurality of wireless lighting devices, each wireless lighting device, in turn, has a main body and further comprising:
  at least one light emitter,
  an optical lens configured to transform light from the at least one light emitter and form a lighting fan directed away from the lighting device,
  an on/off switch configured for wireless operation in response to a common remote controller,
  a battery configured to provide electrical power to the wireless lighting device, and
  a removable mounting configured for removably attaching the main body of the wireless lighting device to the gypsum board so as to direct the lighting fan along an exterior surface thereof,
 (b) removably attaching the plurality of wireless lighting devices to the gypsum board to position thereof in a spaced-apart arrangement, wherein a distance between adjacent wireless lighting devices exceeds a predetermined threshold, for example at least 3 feet, thereby providing lighting coverage throughout a gypsum board working area,
 (c) remotely energizing all of the plurality of wireless lighting devices using the common remote controller, thereby illuminating the gypsum board working area to identify anomalies therein,
 (d) applying a coat of joint compound to low areas to smooth over anomalies identified in step (c) and even out the level of the joint compound with that of surrounding areas of the gypsum board,
 (e) remotely de-energizing all of the plurality of wireless lighting devices using the common remote controller and allowing the coat of joint compound to dry,
 (f) repeating steps (c) through (e) until achieving the smooth finish thereof, and
 (g) removing the plurality of wireless lighting devices from the gypsum board, wherein steps (c) through (f) are conducted without removal or repositioning of the plurality of wireless lighting devices, thereby providing consistent illumination of remaining anomalies in the gypsum board.

BRIEF DESCRIPTION OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

DETAILED DESCRIPTION

The present inventive subject matter now will be described more fully hereinafter with reference to the accompanying drawings, in which embodiments of the inventive subject matter are shown. However, this inventive subject matter should not be construed as being limited to the embodiments set forth herein. Rather, these embodiments are provided so that this disclosure will be thorough and complete, and will fully convey the scope of the inventive subject matter to those skilled in the art. Like numbers refer to like elements throughout.

The expression "illumination" (or "illuminated"), as used herein when referring to a light emitter, means that at least some electrical current is being supplied to the light emitter to cause the light emitter to emit at least some electromagnetic radiation in the form of visible or infrared light. The light may be visible to a naked eye or visible under certain conditions, such as when using specialized goggles. The expression "illuminated" encompasses situations where the light emitter emits electromagnetic radiation continuously, or intermittently at a rate such that a human eye would perceive it as emitting electromagnetic radiation continuously or intermittently, or where a plurality of light emitters of the same color or different colors are emitting electromagnetic radiation intermittently and/or alternatingly, e.g., in such a way that a human eye would perceive them as emitting light continuously or intermittently.

The expression "excited", as used herein when referring to luminescent material, means that at least some electromagnetic radiation (e.g., visible light, UV light, or infrared light) is contacting the luminescent material, causing the luminescent material to emit at least some light. The expression "excited" encompasses situations where the luminescent material emits light continuously, or intermittently at a rate such that a human eye would perceive it as emitting light continuously or intermittently, or where a plurality of luminescent materials that emit light of the same color or different colors are emitting light intermittently and/or alternatingly (with or without overlap in "on" times) in such a way that a human eye would perceive them as emitting light continuously or intermittently (and, in some cases where different colors are emitted, as a mixture of those colors).

The expression "parallel", as used herein, means that two lines do not diverge from each other by more than 5 degrees.

The lighting device of the invention may include at least one light emitter, such as a light-emitting diode (LED) powered by a battery, such as a rechargeable battery, and configured to be energized and de-energized by an on/off switch configured for wireless operation in response to a remote controller. Suitable circuitry may also be housed within the main body of the lighting device and configured to provide suitable electrical energy to energize the light emitter.

A variety of suitable solid-state light emitters can be employed as lighting emitters according to the present invention. Representative examples of solid-state light emitters include light-emitting diodes 9A (inorganic or organic, including polymer light-emitting diodes (PLEDs)) and a wide variety of luminescent materials as well as combinations (e.g., one or more light-emitting diodes and/or one or more luminescent materials).

The solid-state light emitter(s) in any lighting device according to the present inventive subject matter can be of any suitable size (or sizes), e.g., and any quantity (or respective quantities) of solid-state light emitters of one or more sizes can be employed.

A light-emitting diode 9A produces light by exciting electrons across the band gap between a conduction band and a valence band of a semiconductor active (light-emitting) layer. Thus, the color of the light (wavelength) and/or the type of electromagnetic radiation (e.g., infrared light, visible light, ultraviolet light, near-ultraviolet light, etc., and any combinations thereof) emitted by a light-emitting diode 9A depends on the semiconductor materials of the active layers of the light-emitting diode.

Figure 2:
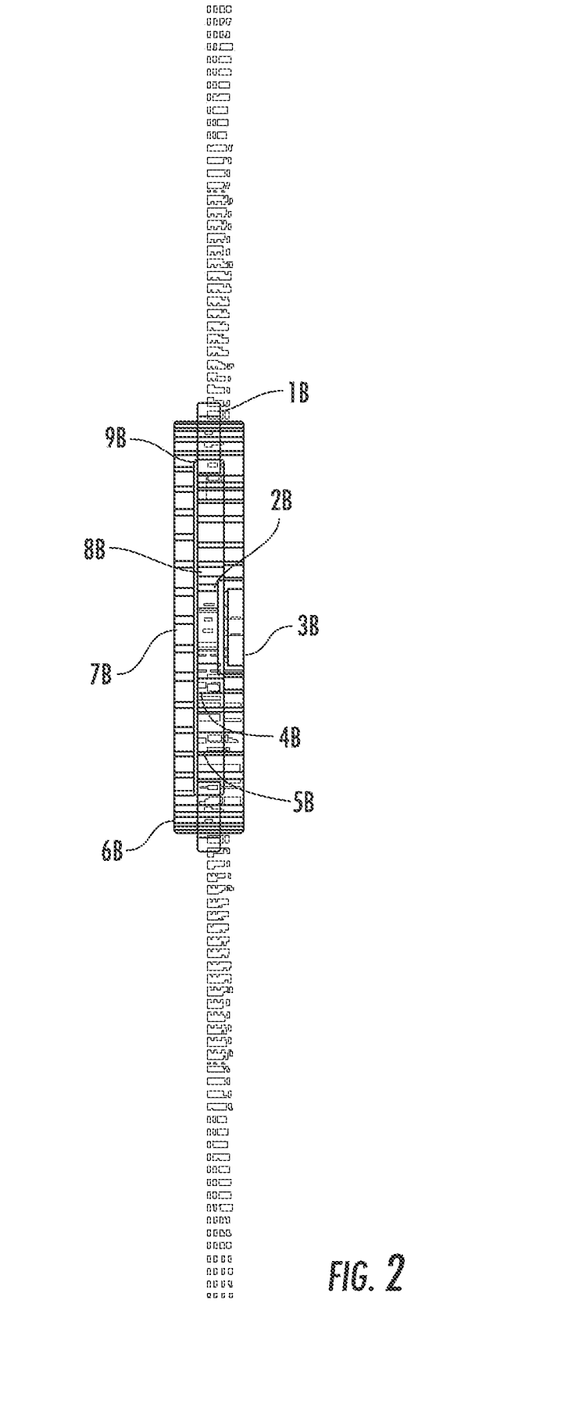
FIG. 2 is a side cross-sectional view of the device of this invention.
Figure 3:
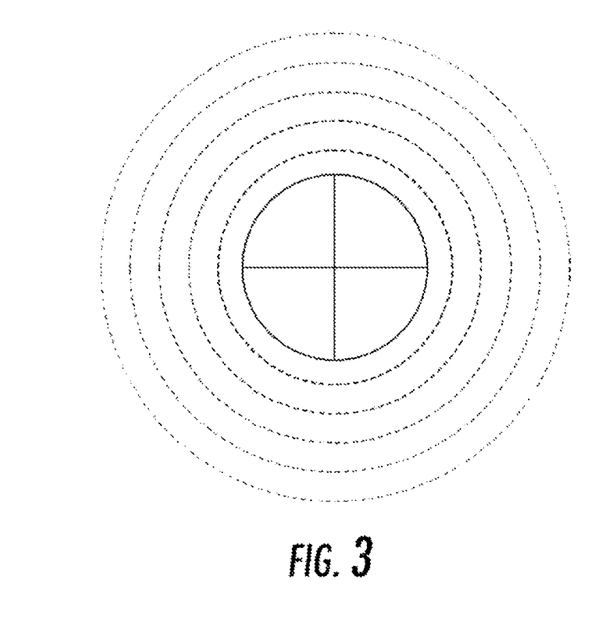
FIG. 3 is an enlarged view of the screw head in gypsum board wall to show where to feather the spackle to minimize or eliminate sanding.
Figure 4:
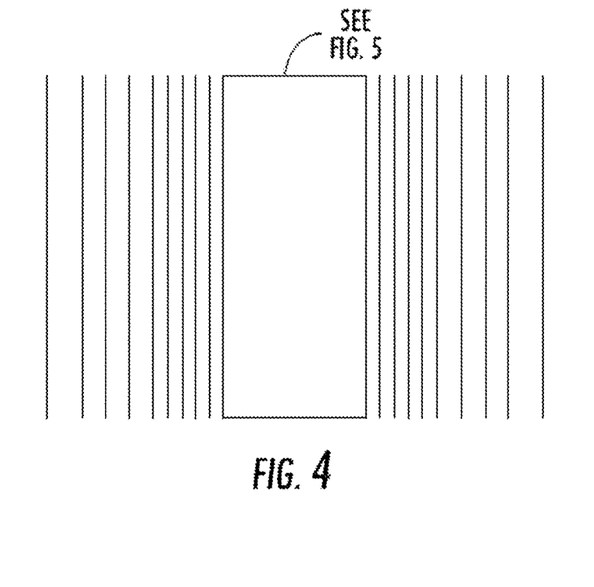
FIG. 4 is an enlarged view of the gypsum board joint with seam tape and spackle to show where to feather the spackle to minimize or eliminate sanding.
Figure 5:
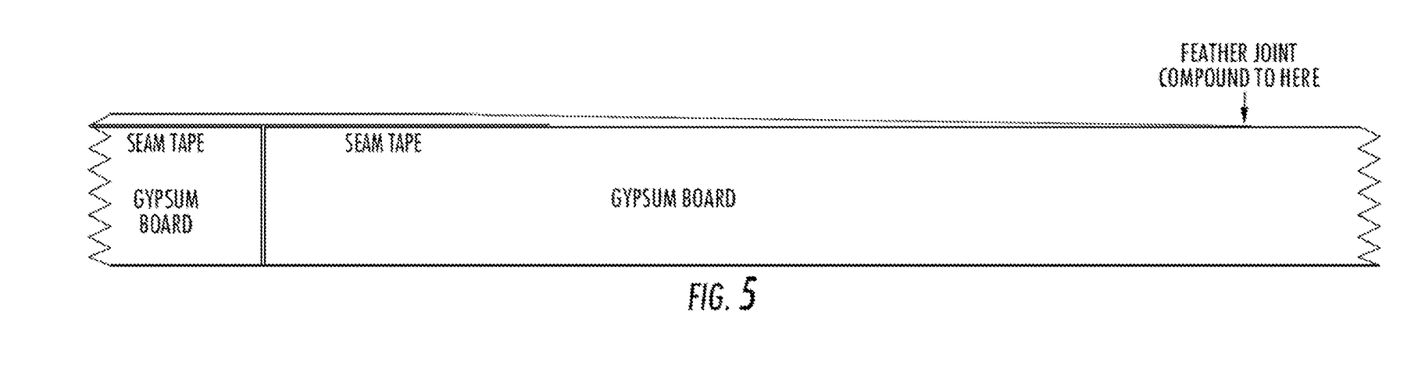
FIG. 5 is an enlarged side view of the seam where two gypsum boards come together; it shows the seam tape and the joint compound applied over the seam tape and how far the taper joint compound has to extend to a height of zero to minimize or eliminate sanding.

An embodiment of the LED 9A of the lighting device in the present invention may include an optical lens 1A of polycarbonate or similar material with internal prisms to transform the light from one or more LEDs and form a lighting fan directed away from the lighting device. The lighting fan may form a generally flat and narrow array of light with an angle of emission of at least 90 degrees directed along and substantially parallel to the gypsum board surface. FIG. 2 shows an example of a lighting fan directed vertically up and down away from the lighting device in the middle of the drawing. The optical lens 1A of the LED 9A exterior portion is smooth, easy to clean, and glare-free when energized.

Figure 1:
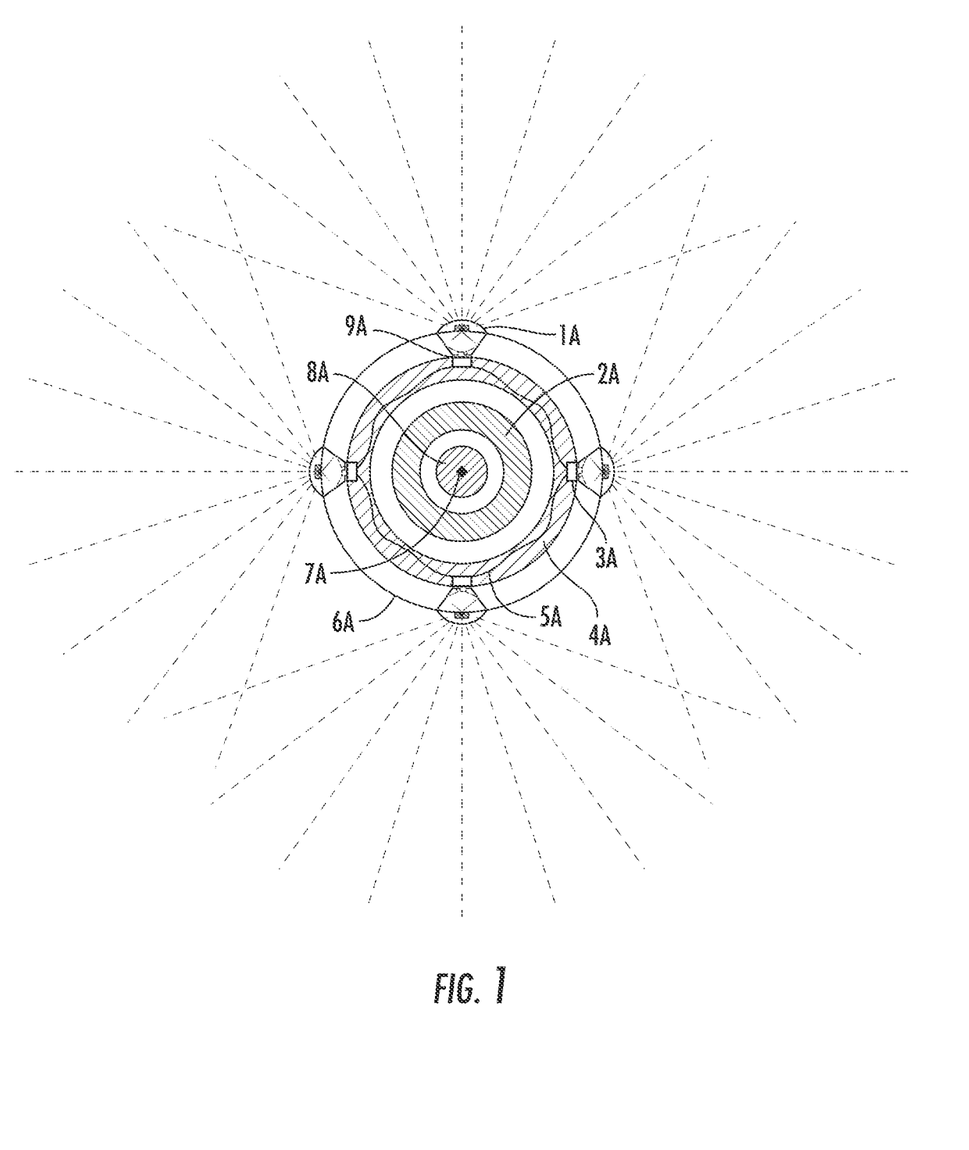
FIG. 1 is an enlarged perspective of the lighting device of this invention.

The wireless lighting device may include at least a first, and optionally a second, a third, and a fourth solid-state light emitter as seen in FIG. 1. Several LEDs may be held in place in the main body. The main body may be designed such that the width dimension thereof may be selected to exceed the size of any openings in the gypsum board. In this case, the single main body may span both sides of the opening and rest on a flat portion of the gypsum board on both sides thereof. Providing a flat bottom surface in the main body may be advantageous in this case so as to facilitate alignment of the main body and the gypsum board. The LEDs may be mounted to direct the light therefrom away from the center of the lighting device and along the surface of the gypsum board.

The solid-state light emitter can be positioned in any suitable way, for example, on one or more circuit boards. In some embodiments, the solid-state light emitter can be placed directly on the main body. In such embodiments, a suitable structure for supplying electricity to the solid-state light emitter(s) can be provided, e.g., one or more contacts, one or more terminals configured to energize the LEDs of the main body. One or more thermal elements can be provided to serve as heat sinks for a specific solid-state light emitter or group of solid-state light emitters.

In one exemplary configuration shown in FIG. 1, the lighting device may include a main body with a magnet 8A and at least four solid-state light emitters 9A. The main body of the wireless lighting device may be configured to fit at least partially within a junction box or another opening in the gypsum board. Alternatively, or additionally, the main body can comprise one or more mechanical structures designed to engage with a junction box (e.g., the main body can have one or more outwardly biased flanges, e.g., that are spring-loaded and that can be retracted or otherwise be pushed inward while inserting the trim element into a junction box. Upon insertion, these structures can be released so that they are pushed outward to hold the main body in place relative to the junction box.

In further embodiments, a reusable layer of temporary adhesive material may be provided on the bottom surface of the main body. A variety of hydrogels and other temporary adhesives may be used for this purpose as known in the art. Adhesive properties of the adhesive layer may be restored by washing off dust or debris after use, or by replacing the used adhesive layer with a new one prior to subsequent use.

To facilitate attachment of the wireless lighting devices to places that are hard to reach, such as high ceilings, the top surface of the main body may be made flat and configured for using an extension pole for placement of the wireless lighting device. In one example, the extension pole may be equipped with a suction cup at the end thereof. The flat surface of the main body may be removably attached to the suction cup so that using the extension pole may facilitate bringing the lighting device to a desired location. Once the lighting device is properly located, a magnetic or an adhesive attachment to the gypsum board or a metal component within the gypsum board may be accomplished. The suction cup may be disconnected from the main body, and the extension pole may be then removed.

FIG. 1 shows an enlarged perspective view of a wireless lighting device comprising a first power supply 2A, at least a first optical lens 1A, and at least a first solid-state light emitter 9A, an LED driver with a heat sink 3A, a wireway 4A, low voltage wire 5A, a main body 6A, a power on/off switch 7A, and a magnet 8A. FIG. 2 shows a side cross-sectional view of the same illustrating respective components of the first optical lens 1B, first power supply 2B, the LED driver with a heat sink 3B, the wireway 4B, the low voltage wire 5B, the main body 6B, the power on/off switch 7B, the magnet 8B, and the first solid-state light emitter 9B. In some embodiments, a suitable power supply 2A is provided to energize the lighting device. The power supply can be divided into two or more sections. Components in lighting devices can be electrically connected to one another, and to the battery via internal wiring 5A.

The main body 6A may be made in a shape of a flat disk, such as a disk of about 4-6 inches in diameter and up to 1 inch in thickness.

In embodiments, the lighting device may be configured for the main body to be located partially inside the junction box while another part of the main body including the light sources and the optical lens may protrude from the junction box so as to direct the lighting fan along the gypsum board surface. An optical lens 1A may be provided, for example, with an array of light-diffusing features, such as a randomly sized and/or spaced apart microlens array.

In some embodiments, light exiting from the lighting device can have a good uniformity of brightness. The expression "good uniformity of brightness" can indicate that when the light exiting from the lighting device is directed toward a first surface as seen in FIG. 6, there are no regions on the first surface where the brightness of light emitted from the lighting device is significantly different from neighboring regions, or there are no significant rings of light where the brightness of light emitted from one lighting device significantly differs from the brightness of light emitted from the another or adjacent lighting device.

Figure 6:
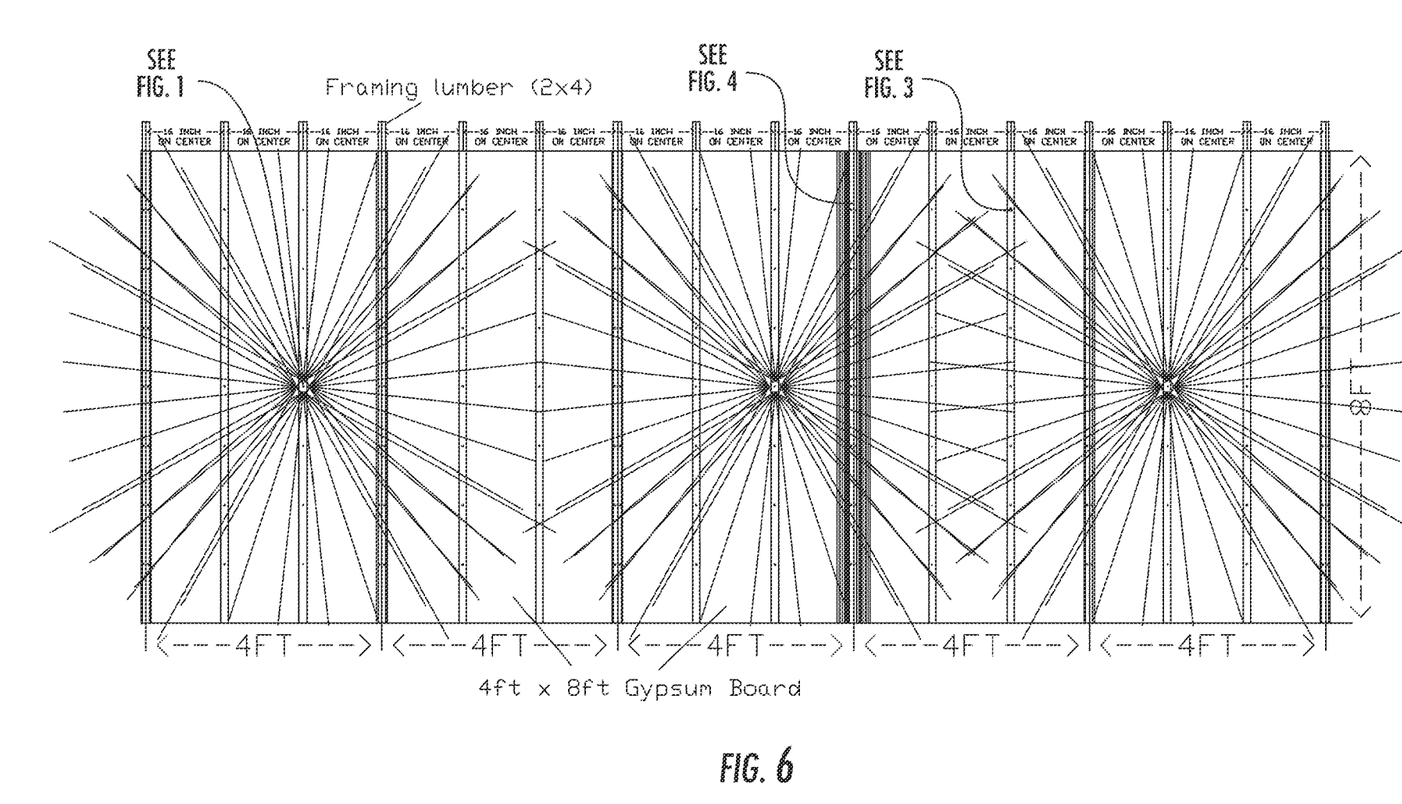
FIG. 6 shows a typical wall section with 3 illuminating devices in place to expose exactly where to apply the joint compound.

A plurality of lighting devices can be magnetically or adhesively mounted to the construction surface of the gypsum board as seen in FIG. 6 and can be spaced apart from each other in a spaced-apart arrangement, such that the distance between adjacent lighting devices exceeds a predetermined threshold, such as at least 2 feet. In other arrangements, the minimum distance between the lighting elements may be at least 2.5 feet, at least 3 feet, at least 3.5 feet, at least 4 feet, at least 4.5 feet, at least 5 feet, at least 5.5 feet, at least 6 feet, at least 6.5 feet, at least 7 feet, at least 7.5 feet, or at least 8 feet. A distance greater than 10 feet between adjacent lighting devices may be detrimental as the lighting extent of the anomalies in the gypsum board may be diminished in this case.

For example, a 4 ft by 8 ft gypsum board structure of FIG. 6 (with anomalies on its surface) can be provided to practice the method of this invention with using the ceiling-mounted lighting device, with the structure mounted so that it has a first periphery in a plane substantially perpendicular to the ceiling and defining a point that extends upward in the middle of a 4 ft by 8 ft gypsum board to direct emitted light across the gypsum board surface, to act as a light for illuminating anomalies, joint compound edges, and other defects from above, a light for illuminating a wall, etc. (in other embodiments, such a ceiling could be flipped so that it directs light downward or horizontally, or an accessory for transferring the lighting device (which can be movable, if desired) can be in any other suitable shape and orientation.

In some embodiments, the lighting devices are configured to provide lumen output of any specific quantity, e.g., at least 500 lumens, at least 600 lumens, at least 700 lumens, at least 800 lumens, at least 900 lumens, at least 1,000 lumens, at least 1,500 lumens, at least 2,000 lumens, at least 2,500 lumens, at least 3,000 lumens, at least 4,000 lumens, or more.

The light emitter to be LED with a Kelvin Temperature can range from 1800K to 10000K, or RGB as required for the application. The light emitter may be also configured to be dimmable or the color of the light emitter may be adjusted using the common remote controller. The battery may be long-life lithium or rechargeable via a wireless recharger supplied with the system. Devices can be stacked to recharge.

Each wireless lighting device may be turned on/off individually via a momentary push button (such as a proximity switch to avoid touching the device) or remotely as a group via wireless communication with a common remote controller. Such remote communication may be done via infrared lights or by a wireless communication protocol, such as Bluetooth. The common wireless remote controller may be a stand-alone device or an APP on a smartphone, a smartwatch, or a wireless computer such as a laptop or a tablet. The remote on/off feature allows the lighting devices to be energized and de-energized without removing or repositioning to allow them to remain in place until the work in the area is complete. This is assumed to be done over several days as successive coats of the joint compound are placed and dried over a number of hours. Consistent illumination of remaining anomalies and all reference points that may remain from the day before are preserved and therefore, rework is kept to a minimum.

In further embodiments, the system of the invention may include a motion detector. It may be a stand-alone device or it may be incorporated with one or more of the plurality of wireless lighting devices. The motion detector may be operated to detect a presence of a worker applying the next coat of the joint compound. The remote wireless controller may be configured to receive a signal from the motion detector indicating the presence or absence of motion in the working area near the plurality of the wireless lighting devices. Once no motion is detected, the remote controller may be configured to turn all lighting devices off automatically, such as after a predetermined period of time, for example, 15 minutes. This feature may allow saving battery power if the worker forgets to turn the lighting devices off at the end of the work.

The one or more motion detectors may also be configured to cause the common wireless remote controller to turn the lighting devices on upon detecting the presence of motion in the vicinity of the system. This may be helpful in automating the operation of the system further to automatically turn the lighting devices on when a worker is present and off after the worker leaves the work area.

Illuminating anomalies on the gypsum board from multiple directions by the plurality of the wireless lighting devices is a key advantage of the invention, especially given the consistency of location of all lighting devices throughout the entire process of producing a smooth finish on the gypsum board. To further highlight anomalies on the gypsum board, the common remote controller may be configured to allow occasional turning off of one or several selected wireless devices—causing the observed anomaly to only be illuminated from one or several remaining lighting devices. Turning some lighting devices on and off may be conducted manually using the remote controller or automatically by programming the lighting devices to periodically turn off for a selected period of time, for example for 1-2 seconds every 20-30 seconds.

The plurality of wireless lighting devices and their common remote controller may also be furnished as a kit. The kit can also be supplied with a charger, a marking tape, marking stickers, and/or a writing tool like a chalk pencil. In addition, a roll of labels may be provided in the shape of arrows and other symbols to be put on surfaces to show where additional filling, sanding, scraping, and feathering are required in preparation for subsequent painting.

In broad terms, the method of the invention comprises the following steps:

(a) providing a plurality of wireless lighting devices as described above, (b) removably attaching the plurality of wireless lighting devices to the gypsum board to position thereof in a spaced-apart arrangement, wherein a distance between adjacent wireless lighting devices exceeds a predetermined threshold, for example at least 3 feet, thereby providing lighting coverage throughout a gypsum board working area, (c) remotely energizing all wireless lighting devices using the common remote controller, thereby illuminating the gypsum board working area to identify anomalies therein, (d) applying a coat of joint compound to smooth over anomalies identified in step (c), (e) remotely de-energizing all wireless lighting devices using the common remote controller and allowing the coat of joint compound to dry, (f) repeating steps (c) through (e) until achieving the smooth finish thereof, and (g) removing the plurality of wireless lighting devices from the gypsum board, wherein steps (c) through (f) are conducted without removal or repositioning of the plurality of wireless lighting devices, thereby providing consistent illumination of remaining anomalies in the gypsum board.

Below is an example of an embodiment of how this invention would be used in practice. The inventor has a garage with a second-floor space. This area is about 13 ft×26 ft with the walls being 8 ft high. The inventor had the space plastered with sheetrock, seam taped, corner trim and one coat of joint compound applied a few years ago.

A lack of confidence in the inventor's spackling skills has put this stage of completing this job on hold. The cost to hire a professional was outside the inventor's budget. Using the method of the disclosed invention would help to move it forward again. With this product, the first step of applying one thin coat of joint compound has already been completed. This would have been without the method of this invention being utilized, so the inventor can move to the next step.

The next step would be to attach each lighting device with the magnet to a respective screw head and space them roughly 6 ft apart. For this size area, about 16 devices would be needed, evenly spaced to cover all the walls and ceiling at one time. This would make it so one did not need to move the devices and lose the reference points on the surfaces until the entire job of achieving a smooth finish of all gypsum surfaces is done.

The second layer of the joint compound would then be applied to the seams, corner trim, and screw holes, making sure that the edges of the joint compound were tapered to the height zero, matching the height of the drywall.

The devices are then shut off remotely with a common remote controller.

The following step is done the next day after the joint compound had dried. The devices would be turned back on and the third coat of joint compound would be applied, following the same tapering procedure as in step two. Once all areas were covered, the devices would then be shut down for the day.

The following day the surfaces could be inspected and marker labels or a chalk pencil applied where additional attention was needed. Once all surfaces pass inspection, the paint can then be applied.

Below is another example of how the disclosed invention would be practiced. This product can be used on a small scale and also expanded to a larger scale. The device could help homeowners who do small to medium home improvements like kitchens, bathrooms, or finishing a basement. Figuring a room 10 ft×10 ft would use 10 devices to cover the walls and ceiling. These devices could be purchased in a package of 10 pieces with a remote controller and a charger.

For a home improvement contractor, if they were working on a single-family home total remodeling project, they may have 10 rooms to be done in total. This would require a more substantial system to carry and quickly inventory all the lighting devices. This system may be organized in a dedicated carrying case. The center portion could be used for storing marking products.

This system would have 100 wireless lighting devices, a carrying case, as well as one or more chargers, and a Bluetooth-enabled remote controller.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of identifying anomalies in a gypsum board and creating a smooth finish thereon, the method comprising the following steps:
    a. providing a plurality of wireless lighting devices, each wireless lighting device, in turn, has a main body and further comprising:
        at least one light emitter,
        an optical lens configured to form a lighting fan directed away from the lighting device,
        an on/off switch configured for wireless operation in response to a common remote controller,
        a battery configured to provide electrical power to the wireless lighting device, and
        a removable mounting configured for removably attaching the main body of the wireless lighting device to the gypsum board so as to direct the lighting fan along an exterior surface thereof,
    b. removably attaching the plurality of wireless lighting devices to the gypsum board to position thereof in a spaced-apart arrangement, wherein a distance between adjacent wireless lighting devices exceeds a predetermined threshold, thereby providing sufficient lighting coverage throughout a gypsum board working area to identify anomalies therein,
    c. remotely energizing all of the plurality of wireless lighting devices using the common remote controller, thereby illuminating the gypsum board working area to identify anomalies therein,
    d. applying a coat of joint compound to smooth over anomalies identified in step (c),
    e. remotely de-energizing all of the plurality of wireless lighting devices using the common remote controller and allowing the coat of joint compound to dry,
    f. repeating steps (c) through (e) until achieving the smooth finish thereof, and
    g. removing the plurality of wireless lighting devices from the gypsum board,
    wherein steps (c) through (f) are conducted without removal or repositioning of the plurality of wireless lighting devices, thereby providing consistent illumination of remaining anomalies in the gypsum board.

2. The method as in claim 1, wherein the predetermined threshold in step (b) is at least 3 feet.

3. The method as in claim 1, wherein the predetermined threshold in step (b) is at least 6 feet.

4. The method as in claim 1, wherein in step (a) each wireless lighting device further comprises additional light emitters, wherein all light emitters are positioned to direct light outwards in all directions away from the wireless lighting device and within a common plane defining the lighting fan thereof.

5. The method as in claim 4, wherein in step (a) all light emitters are configured for simultaneous energizing and de-energizing by the on/off switch of the wireless lighting device.

6. The method as in claim 1, wherein in step (a) the at least one light emitter is a light-emitting diode.

7. The method as in claim 6, wherein in step (a) the at least one light emitter is a light-emitting diode configured to emit visible light.

8. The method as in claim 6, wherein in step (a) the at least one light emitter is a light-emitting diode configured to emit ultraviolet light.

9. The method as in claim 6, wherein in step (a) the at least one light emitter is a light-emitting diode configured to emit light with a Kelvin temperature between 1800K and 10000K.

10. The method as in claim 1, wherein in step (a) the removable mounting comprises a magnet attached to the main body of the wireless lighting device.

11. The method as in claim 1, wherein in step (a) the removable mounting comprises an adhesive layer on a bottom of the main body of the wireless lighting device.

12. A system of devices for identifying anomalies in a gypsum board and locations requiring further work to achieve a smooth finish thereof, the system comprising a plurality of wireless lighting emitters and a common controller configured to remotely turn all of the plurality of wireless lighting emitters on or off, wherein each wireless lighting device in turn comprises:
    at least one light emitter,
    an optical lens configured to form a lighting fan directed away from the lighting device,
    an on/off switch configured for wireless operation in response to the common remote controller,
    a battery configured to provide electrical power to the wireless lighting device, and
    a removable mounting configured for removably attaching the main body of the wireless lighting device to the gypsum board so as to direct the lighting fan along an exterior surface thereof.

13. The system as in claim 12 further comprising a motion detector configured to communicate with the common controller, wherein the common controller is further configured to turn all wireless lighting devices off when no motion is detected by the motion detector.

14. The system as in claim 13, wherein the common controller is further configured to turn all wireless lighting devices on upon the motion detector detecting motion.

15. The system as in claim 12, wherein the at least one light emitter is configured to be dimmable via the common remote controller.

16. The system as in claim 12, wherein the at least one light emitter is configured to allow color adjustment via the common remote controller.

* * * * *